(12) United States Patent
Clynes et al.

(10) Patent No.: US 7,577,981 B2
(45) Date of Patent: Aug. 18, 2009

(54) UPDATING EMBEDDED FIRMWARE IN A VIDEO SYSTEM

(75) Inventors: Steven Clynes, Allen, TX (US); Kevin Chalmers, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 901 days.

(21) Appl. No.: 11/095,358

(22) Filed: Mar. 31, 2005

(65) Prior Publication Data
US 2006/0170661 A1    Aug. 3, 2006

Related U.S. Application Data

(60) Provisional application No. 60/649,805, filed on Feb. 3, 2005.

(51) Int. Cl.
*H04N 7/173* (2006.01)
*H04N 7/16* (2006.01)
*G06F 9/44* (2006.01)

(52) U.S. Cl. .................. 725/132; 725/140; 725/152; 717/168; 717/172

(58) Field of Classification Search .................. 725/112, 725/113, 132, 140, 152
See application file for complete search history.

(56) References Cited

U.S. PATENT DOCUMENTS

| 5,309,235 | A | * | 5/1994 | Naimpally | 348/476 |
| 6,157,411 | A | * | 12/2000 | Williams et al. | 725/139 |
| 2003/0135868 | A1 | * | 7/2003 | DeGeorge | 725/152 |
| 2003/0177497 | A1 | * | 9/2003 | Macrae et al. | 725/60 |
| 2004/0163135 | A1 | * | 8/2004 | Giaccherini et al. | 725/136 |

* cited by examiner

*Primary Examiner*—Christopher Kelley
*Assistant Examiner*—Randy Flynn
(74) *Attorney, Agent, or Firm*—John J. Patti; Wade J. Brady, III; Frederick J. Telecky, Jr.

(57) ABSTRACT

An electronic device (18). The device comprises an analog (16) interface for receiving an analog waveform. The device also comprises an image screen (20) and circuitry (42) for at times displaying an image on the image screen in response to at least a portion of the analog waveform. The device also comprises a memory (48) for storing firmware code and circuitry (44, 46) for at times writing firmware code in the memory in response to at least a portion of the analog waveform.

21 Claims, 4 Drawing Sheets

UPDATING EMBEDDED FIRMWARE IN A VIDEO SYSTEM

CROSS-REFERENCES TO RELATED APPLICATION

This application claims priority, under 35 U.S.C. Section 119, to provisional application U.S. Ser. No. 60/649,805, filed Feb. 3, 2005, entitled "A Method of Updating Embedded System Firmware in Video."

STATEMENT REGARDING FEDERALLY SPONSORED RESEARCH OR DEVELOPMENT

Not Applicable.

BACKGROUND OF THE INVENTION

The present embodiments relate to electronic devices and are more particularly directed to updating (i.e., modifying) embedded firmware in a video system.

Electronic devices are extremely prevalent and beneficial in today's society and are constantly being improved due in part to consumer and user demand. Various technological examples exist in the video industry including devices such as digital video disk ("DVD" or "digital versatile disk") players, digital video recorders, television displays, monitors, and so forth. Many of these systems include complex embedded system firmware to control various operations of the video system and its video processing. As complexity has increased, so has the need for possibly changing the firmware code after a device is developed or even after it has entered into marketplace. The reason(s) dictating the desired change may vary. For example, there is the possibility of programming errors (so-called "bugs") in the firmware code and, arguably, this possibility increases with device and firmware complexity. As another example, a system may be released with a version of firmware that supports certain functionality, while thereafter it is determined that the system hardware could support additional desired functionality were a change to the firmware code made possible. Indeed, as video devices tend more recently to utilize operating systems, there is an increase in both capability as well as complexity. As still another example, with market forces often driving an expedited schedule to place a product into the marketplace, there is the chance that firmware-supported features may be incomplete or missing or may not have been fully tested prior to entering the marketplace. In all of these situations, therefore, it may be desirable to change or update the embedded system firmware so as to address the corresponding situation.

According to the prior art, there are various manners for updating embedded system firmware. As one example, in personal computers and some electronic devices, a digital interface may exist to download (or "flash") new code into the system firmware. Such an interface may be by way of a Universal Serial Bus ("USB") or Ethernet connection. As another example, some contemporary DVD players and DVD recorders permit an update to the device's embedded system firmware by loading a DVD into the device's DVD drive, so that new firmware code on a DVD in the drive may be read and copied to the device's embedded system firmware code, thereby achieving the update. While the preceding approaches work in those described devices, other devices may not include such connectivity or readable drives, where indeed these items often are not included for reasons such as reducing device complexity and cost Thus, for these latter devices, an update to firmware may require a complex approach, such as disassembling the device by a skilled practitioner. In a consumer application, therefore, the device often must be returned to the manufacturer or otherwise delivered to an appropriate technician. As a result, often an update that might prove desirable is not performed due to the resource costs that would accompany the complex steps needed to perform that update.

As a result of the preceding, there arises a need to address the drawbacks of the prior art as is achieved by the preferred embodiments described below.

BRIEF SUMMARY OF THE INVENTION

In one preferred embodiment, there is an electronic device. The device comprises an analog interface for receiving an analog waveform. The device also comprises an image screen and circuitry for at times displaying an image on the image screen in response to at least a portion of the analog waveform. The device also comprises a memory for storing firmware code and circuitry for at times writing firmware code in the memory in response to at least a portion of the analog waveform.

Other aspects are also disclosed and claimed.

DETAILED DESCRIPTION OF THE INVENTION

The preferred embodiments are described below in connection with a DVD ("digital video disk" or "digital versatile disk") player coupled to provide an analog video signal to an analog interface of a video device so as to provide firmware update data to the video device. The present inventors believe that the preferred embodiments are especially beneficial in such applications. However, the preferred embodiments also may be implemented in, and provide significant benefit to, other electronic devices as well. Accordingly, it is to be understood that the following description is provided by way of example only and is not intended to limit the inventive scope.

Figure 1:
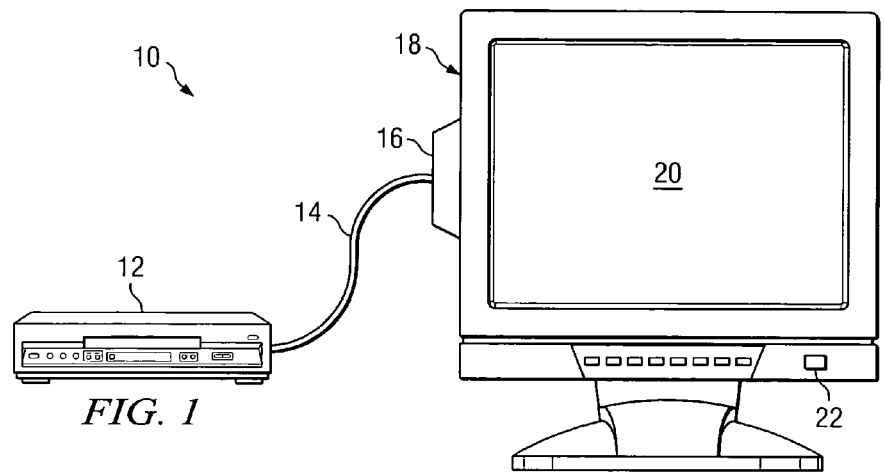
FIG. 1 illustrates a system as an example of the preferred embodiments.

FIG. 1 illustrates a system designated generally at 10 and as an example of the preferred embodiments. In general at the level illustrated in FIG. 1, each item in system 10 is known in the art; however, as detailed later, the methodology of operation as well as certain functions added to these devices provide for the preferred embodiments and operate to improve system 10 as a whole. Looking then to system 10 in general, it includes a media receiving and output device 12 that is shown by way of example as a DVD player, although as shown below device 12 may be a different type of analog video transmission device, such as a video cassette recorder ("VCR") or even a unit or antenna which receives as its medium an over-the-air ("OTA") transmission. Device 12 is operable to read data from a medium, which in the case of DVD player is a separate DVD or CD (not shown) that is inserted into device 12, and to provide a corresponding analog signal output along a cable 14. Thus, other examples of device 12 include a VCR or still other devices that receive, and in many instances read, a medium, and where the device then outputs a corresponding analog signal that is operable to at least include video data. Cable 14 is connected to an analog interface 16 of a video device 18. Video device may be one of various devices such as a monitor, CRT, television, and so forth, all of which are capable of receiving an analog video signal from an external source. Moreover, device 18 includes sufficient circuitry to decode the analog signal received at analog interface 16 and to provide a video signal, corresponding to the analog signal of cable 14. The video signal is then used to display an image at a screen 20.

The operation of system 10 is now introduced, with additional details provided throughout the remainder of this document. In various respects, system 10 may operate according to the prior art. In this case, a user provides a DVD into a DVD player functioning as media receiving and output device 12 (through a tray, slot, or the like), and the digital data on that DVD is converted or encoded into an analog video frame waveform that is coupled to cable 14. Cable 14 communicates the analog waveform to interface 16 of video device 18. In response to this external source providing the analog waveform, video device 18 sufficiently processes the waveform and displays a corresponding image on screen 20. Continuing with the operation of system 20 but looking now to additional functionality of the preferred embodiments, in addition to data for displaying an image, in the preferred embodiment the DVD used in deice 12 includes digital data for purposes of updating the firmware code in video device 18. According to alternative preferred embodiments detailed later, this firmware code may be located in the vertical blanking data ("VBI" data) section of the DVD or, alternatively or in addition thereto, such firmware code may be located in the active video data of the DVD. In either event, preferably the user of system 10 provides a user enable input to video device 18, such as by depressing a button 22 or through some other manner such as pressing a button on a remote control, not shown, or responding to a screen prompt, menu, or the like. The user enable informs video device 18 that it is to receive updated firmware code as part of the analog video frame waveform it is receiving (or will be receiving) from an external source and, therefore, to process that code accordingly. In an alternative embodiment, this enablement may be automated or eliminated, although it is preferable so to avoid undesired or even surreptitious changing of firmware code. In response to this user input, as an analog video frame signal is received by video device 18 at its interface 16, then video device 18 includes circuitry that decodes the analog signal into a stream of digital data and that data is used to update the firmware code of video system 18. All of these details should be further appreciated by one skilled in the art given the remaining discussions provided below.

Figure 2:
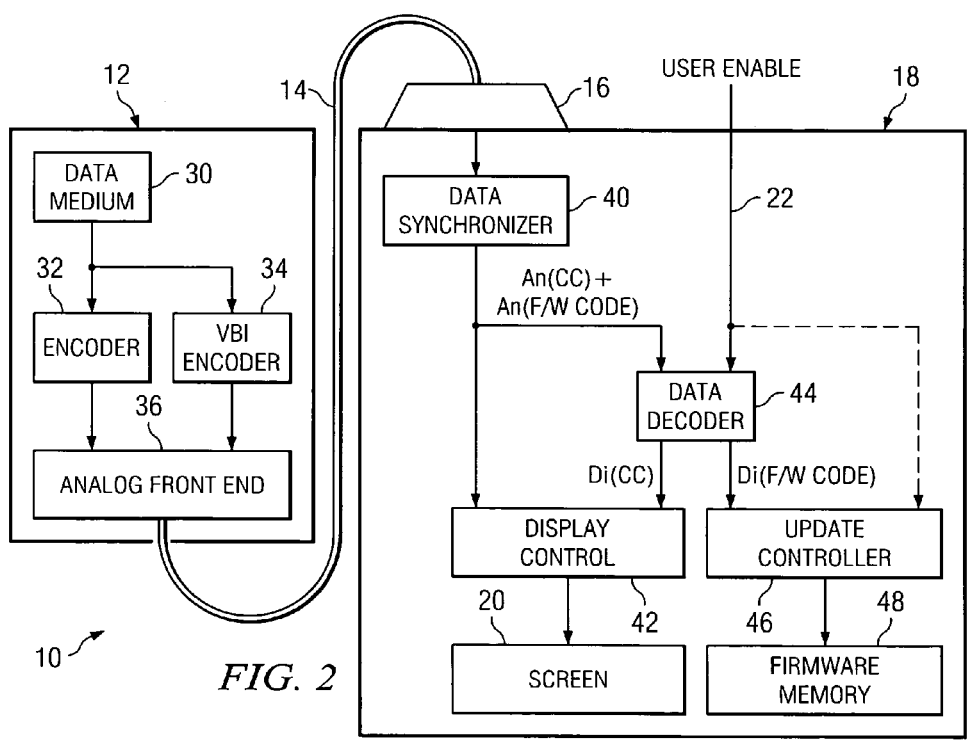
FIG. 2 illustrates a functional block diagram of various aspects of system 10 of FIG. 1.

FIG. 2 illustrates a functional block diagram of various aspects of system 10 in greater detail when receiving and output device 12 is implemented as a digital reading device (e.g., DVD player). By way of introduction, note that each block of FIG. 2 is shown only for sake of demonstrating a function, so one skilled in the art may implement these functions with various known or ascertainable forms of hardware and software. Indeed, various of these functions exist in certain respects in the art and are readily modified to accommodate the additional functions specified in this document. In addition, while FIG. 2 illustrates functions of device 12 and video device 18, note that these devices may include numerous functions that are not shown so as to simplify the present illustration and discussion by focusing on certain aspects as relating to the preferred embodiments. Lastly and as introduced earlier, while FIG. 2 illustrates device 12 as a DVD player, an analog reading device such as a VCR, or indeed other analog-producing devices, such as an antenna with or without an associated unit that receives an OTA signal, may be substituted in its place, as also will be further appreciated later.

Looking in detail to the functional blocks of media receiving and output device 12 as illustrated in FIG. 2, a data medium 30 is provided to device 12, which includes recorded data in the form of video frame data but that is intended for purposes of updating the firmware code on video device 18. Note that data medium 30 also may include other data, such as actual video frame data to cause a desired image to be displayed by video device 18. For sake of the present example wherein device 12 is shown in FIG. 1 as a DVD player, then data medium 30 is a DVD, CD, or other media capable of being read by such a device so as to provide a corresponding output video frame analog signal. Data read from data medium 30 is coupled to a video encoder 32, which may include a digital-to-analog ("D/A") converter, and also to a VBI encoder 34. The output of video encoder 32 and of VBI encoder 34 is connected to an analog front end 36. Analog front end 36 may include various known circuitry such as amplifiers and the like for conditioning the combined video signals from both encoders 32 and 34 prior to transmission of those signals, and it also provides an interface to couple to cable 14.

The operation of media receiving and output device 12 is now introduced, and will be further appreciated later in combination with video device 18. VBI encoder 34 is operable, as known in the art, to identify certain lines of data on data medium 30 and to encode the data on those lines so that such data is properly treated by a video device, such as video device 18. For example, in the case of contemporary DVDs as medium 30, then in the timing locations for lines 21 and 284 of an NTSC video signal, which as detailed later are outside the visibly active region of the video display, a DVD will store VBI data in a form that is different than that of an ordinary video signal. Specifically, instead of the data being provided to generate an analog waveform that ultimately controls a video device so as to display a video image, lines 21 and 284 are digital data that are to be encoded for purposes of certain functions like close captioning (or teletext in PAL systems), and indeed note that certain regulations may legally require devices such as device 12 to include such functionality. Accordingly, this data is identified and encoded by VBI encoder 34 so that it may be received by a video device and used for close captioning (or teletext) purposes; as a result, in the example of close captioning data, once the VBI data is properly encoded and transmitted, a video device in response may then superimpose on its active video display a set of alphanumeric characters in response to the close captioning data. In addition, however, in one preferred embodiment, data medium 30 also may store update firmware code in the digital stream and at timing locations that correspond to lines 21 and 284 of an NTSC video signal. As a result of the timing locations of that data, this firmware is treated by VBI encoder 34 as VBI data and encoded as such into an analog waveform having the same attributes of a VBI analog waveform Similarly, video encoder 32 receives video image data from medium 30 and encodes it into the format of a known video analog waveform. The video waveform from video encoder 32 and the VBI waveform from VBI encoder 34 are both connected to analog front end 36. Analog front end 36 operates as known in the art to properly transform any signal either from encoder 32 or encoder 34, where the resulting waveform is to be compatible with a video device (e.g., video device 18) that will receive this signal. Thus, the transformed analog waveform is coupled to cable 14. Lastly, note that where device 12 is implemented as a VCR or the like, then the signal stored on medium 30 is in the form of an analog signal stored on a magnetic tape and, thus, a digital-to-analog conversion such as from converter 32 is typically not implemented (unless the tape stores a digital signal and device 12 is encoding that signal) in that the VBI data is already in analog form so that a separate VBI encoder 34 is typically not required for such an application.

Looking now in FIG. 2 to video device 18, it receives the externally-supplied analog waveform from cable 14 at its analog interface 16. The analog waveform is then coupled to a data synchronizer 40, as it is known that each line of video data will include some type of synchronization data by which data synchronizer 40 can synchronize to the incoming data. The remaining data is then provided to a display control 42 and a data decoder 44, where data decoder 44 also receives a user enable signal that is identified at 22 in FIG. 2 to correspond to button 22 shown in FIG. 1, which recall is depressed by a user to cause a firmware update as further appreciated later. The output of data decoder 44 is also connected to display control 42 as well as to an update controller 46. The output of display control 42 is connected to screen 20, and the output of update controller 46 is connected to firmware memory 48.

The operation of video device 18 is now described in various respects, and by introduction it is noted that for ordinary video and close captioned data received via cable 14 at analog interface 16, video device 18 may operate as known in the art. Briefly with respect to these types of data, first they are coupled to data synchronizer 40, which for each line of data identifies a synchronizing waveform and thereby synchronizes the operation of the functions in device 18 to the incoming signal. The remaining analog signal of the received video waveform is then coupled to display control 42 and data decoder 44. For the ordinary video signal, display control 42 operates as known in the art to control its image producing hardware, where the particular signal and operation may vary based on the format of the signal and hardware (e.g., NTSC, PAL, and so forth). For example, in a composite (or CVBS) video signal in NTSC, the instantaneous amplitude of the analog signal is decoded to produce a corresponding intensity (i.e., luma) in an electrical beam that scans approximately horizontally across a cathode ray tube, while color (i.e., chroma) is provided by a sine wave added on top of the intensity signal, thereby providing amount of color (or saturation) and the tint (or hue) of the color. In any event, therefore, in response to the analog video waveform as interpreted by display control 42, a corresponding image is displayed on screen 20.

Figure 3:
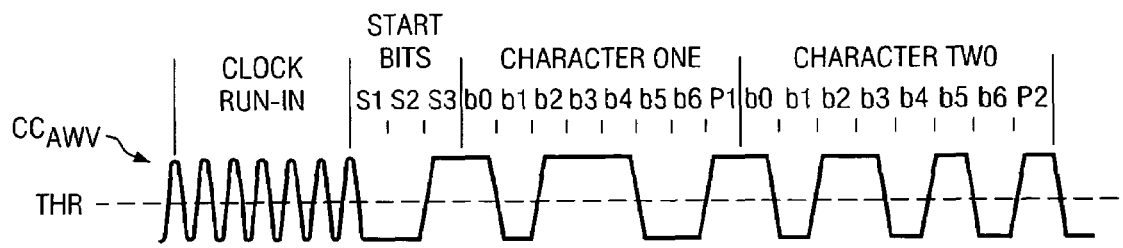
FIG. 3 illustrates a portion of a typical VBI close captioned analog waveform $CC_{AWV}$.

Also as part of the operation of video device 18, any analog close captioned (or other) VBI data (shown as An(CC) in FIG. 2) included in the incoming video waveform is identified by its timing location (e.g., lines 21 and 284 of an NTSC video signal), and that data is decoded by data decoder 44. To further appreciate this aspect as well as others discussed later, FIG. 3 illustrates the encoded format of a portion of a typical VBI close captioned analog waveform $CC_{AWV}$. For the portion shown in FIG. 3, waveform $CC_{AWV}$ includes a dock run-in period used for purposes of synchronizing, calibrating, and adjusting the data slicer that is included in data decoder 44, and it also may be used to distinguish a valid VBI signal from a noise signal. Following the clock run-in is a period wherein the analog signal is intended to be sliced to interpret it as three start bits. As known in the VBI art, slicing is performed so as to determine a resolution of two, that is, the amplitude of the $CC_{AWV}$ analog signal is sampled and determined to correspond to only one of two binary values, that is, it is "quantized" to only one of two values. For sake of simplicity, in FIG. 3 a threshold THR is shown to depict this resolution, where an analog magnitude level above the threshold THR is interpreted as one binary value (e.g., 1) and an analog magnitude level below the threshold THR is interpreted as another binary value (e.g., 0). Also, in actual implementation, note that often the slicer is more sophisticated and may remove noise and be level-dependent or transition timed and threshold THR may be adjusted over time. Further, slicing may be implemented in various fashions, including as a hardware slicer or as a functionality that is performed in part or whole by a system processor. Given the preceding, one skilled in the art will appreciate that in the example of FIG. 3, the three start bits are sliced to provide corresponding binary values of 001. Following the three start bits are two character words, where the first 7 bits of each word are the actual close captioned data and the eighth bit is a parity bit. Thus, a first and second character byte are provided by the illustrated respective eight bits and have binary values in the illustrated example of 10111001 and 10110101, respectively. Thus, when these two characters are sliced by data decoder 44, two digital close captioned alphanumeric counterpart signals (shown as Di(CC) in FIG. 2) are provided to display control 42. In response and as known in the art, the close captioned data is superimposed or otherwise displayed either with or in lieu of the remaining video image on screen 20.

Additional operation of video device 18 is now described in connection with added functionally according to one preferred embodiment. When user enable 22 is asserted, such as by a user depressing the associated button 22 in FIG. 1 or by otherwise enabling the present functionality, data decoder 44 is enabled to interpret at least a portion or all of the incoming VBI data as firmware code. Accordingly, in FIG. 2, when user enable signal 22 is asserted, once again data decoder 44 identifies the VBI data in the video signal having been synchronized by data synchronizer 40, where again the portion of the video signal constituting VBI data may be identified by its timing location (e.g., lines 21 and 284 of an NTSC video signal). However, in the preferred embodiment, recall from above that data medium 30 includes firmware code for purposes of updating the firmware code on video device 18. More particularly, in one preferred embodiment, that updating firmware code is stored on medium 30 as VBI data, that is, in lieu or in addition to close captioning or other VBI data. Thus, data synchronizer 40 not only receives analog VBI data which recall is shown as An(CC) in FIG. 2, but it also receives analog firmware code, which is shown as An(F/W code) in FIG. 2. As a result, when user enable 22 is asserted, data decoder 44 operates to slice the two words of the firmware code and to provide those words in digital form, shown in FIG. 2 as Di(F/W code), to update controller 46. Update controller 46 is thereby informed by receipt of this data, or alternatively it too could be enabled by user enable signal 22 as shown by way of example with a dashed line in FIG. 2, to manage the flow of this data to firmware memory 48 of video device. Accordingly, in one example, when two words of firmware code are received by update controller 46 from data decoder 44, those two words are then written by update controller 46 to firmware memory 48, thereby updating two corresponding bytes in firmware memory 48.

In other aspects of the preferred embodiments, note that update controller 46 may include additional functionality with respect to the received firmware data, with particular examples of certain checking functions that operate prior to permitting the overwriting of code in firmware memory 48. For example, one such function is decompressing data if it is received in compressed form. As another example, error checking may occur. As still another example, received firmware may be written to include a version number, and the preferred embodiment may include a function to compare that number with a version number corresponding to the firmware code that is presently stored in firmware memory 48 so as to ensure that the newly-received firmware code (decoded from the received analog signal) is in fact a newer version than that already stored in firmware memory 48. As yet another example, the preferred embodiment may include a function to determine that the newly-received firmware code is compatible with the applicable hardware of video device 18. Lastly, note that update controller 46 also may be precluded from writing firmware code to certain locations of memory 48 so that the code in those locations is protected and may be used to recover the system should an upgrade not produce successful results.

Given the preceding discussion of the operation of video device 18 and particularly with respect to its operation to update firmware memory 48, note various benefits of the preferred embodiment as thus far described. The ability to update firmware in a system requires transferring digital program or firmware code to the system. However, in the preferred embodiment, functionality has been shown whereby analog data may be received from a source external from video device 18, which in the example illustrated is a DVD player operating as media receiving and output device 12, and that analog data is then internally converted by video system 18 into digital data and then used to update the firmware code. Note that such an approach has numerous benefits in the present and future state of the art. For example, many consumers presently have DVD players (or VCRs, or can receive OTA broadcasts) as well as video systems where the systems have only an analog interface, and the DVD players due to the close captioning requirements are already able to encode certain data in a form that may be used per the preferred embodiment to update firmware. With the preferred embodiment, additional functionality may be added to the video system whereby a consumer is then able on their own to update the firmware code in the video system. As a result, many of the drawbacks of the prior art may be reduced or eliminated. For example, software errors or "bugs" in the video system may be corrected with firmware patches by providing to the consumer a DVD (or other data medium 30 or OTA broadcast) that includes the corrected patch, and the consumer may then easily update their own device without having to return the device or otherwise involve the manufacturer. As another example and with respect to manufacturers, their time to market may be reduced as they are able to release products with firmware that has been tested to a certain degree of confidence, knowing that any later-discovered firmware changes may be achieved by the consumer according to the preferred embodiment. As still another example, the preferred embodiment firmware update may be achieved without an external digital interface on the video system.

Additional preferred embodiments are also now developed with respect to considerations of the amount of firmware code that may be communicated to video system 18 over time. By way of introduction, in connection with the preferred embodiment described above wherein two words of firmware code are sent per VBI line, note that for a typical interlaced video display, only one line of VBI close captioned data is transmitted per set of horizontal scans, and two sets of these scans are transmitted for each full display or "frame" of video information. Thus, four words of VBI data are transmitted per frame. Moreover, the frame frequency is $\frac{1}{30}^{th}$ second, so in one second, 120 words of VBI data are transmitted and in one minute 7200 words of VBI are transmitted. At this rate of 7200 words/minute, certain firmware updates may be reasonably achieved. However, with the advent of larger firmware systems due to greater complexity, functionality, use of operating systems, and the like, then a larger amount of data for a firmware update may be required and the rate of 7200 words/minute may prove less than optimal in those cases. Accordingly, in other preferred embodiments various other functions and methodologies are employed to increase the firmware update data rate. By way of introduction, in a first such alternative preferred embodiment, firmware code is included either in lieu of or in addition to locating it in the VBI data (e.g., lines 21 and 284 of an NTSC video signal) by also locating it in the timing of active video data. In a second alternative preferred embodiment, again the firmware is outside the lines of the VBI data, and it is decoded in a manner to allow greater granularity than the resolution of two that is provided in contemporary VBI decoding. Each of these alternative preferred embodiments is further explored below.

Figure 4A:
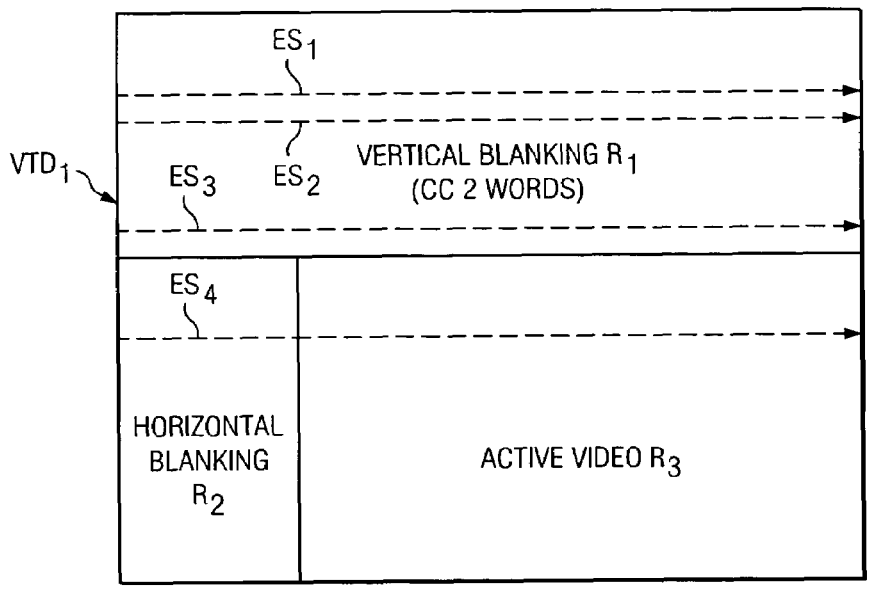
FIG. 4a illustrates a video timing diagram $VTD_1$ that in various parts is known in the art and is used to symbolize the timing of video data as provided to a video device.

FIG. 4a illustrates a video timing diagram $VTD_1$ that in various parts is known in the art and is used to symbolize the timing of a frame of video data as provided to a device such as video device 18. In general, video timing diagram $VTD_1$ is intended to depict time first from left to right and second from top to bottom, as that time corresponds to the stream of video data provided to video device 18 and its corresponding traces or scanning of a resulting signal across screen 20. Specifically, diagram $VTD_1$ includes three regions, namely, a vertical blanking region $R_1$, a horizontal blanking region $R_2$, and an active video region $R_3$. These regions demonstrate the various timing periods in an encoded video signal, that is, as the continuous signal is received, then portions of it at one time correspond to vertical blanking region $R_1$, portions of it at another time correspond to horizontal blanking region $R_2$, and portions of it at another time correspond to active video region $R_3$. In general and as borne out by a few examples in FIG. 4a as well as FIG. 4b, below, active video region $R_3$ corresponds to data that is received by video device 18 at certain timing intervals and for which a corresponding image is displayed on screen 20. However, vertical blanking region $R_1$ and horizontal blanking region $R_2$ are regions for which data is not received or, if it is received, no visible corresponding video image is displayed on screen 20. These various regions are further explored below, as are the relationships to the preferred embodiments.

Vertical blanking region $R_1$ exists in part to depict that time is needed for the screen 20 scanning mechanism (e.g., beam on a cathode ray tube) to return vertically from the bottom of the screen 20 to the top of the screen. Thus, consider over a first time period $P_1$ a first set of video data is transmitted by an analog signal to video device 18 and, in response, a corresponding example scan $ES_1$ is shown. However, note that example scan $ES_1$ falls within vertical blanking region $R_1$. Vertical blanking region $R_1$ is therefore intended to depict an instance where data may be received by device 18 but no corresponding video image is displayed on screen 20. In other words, as known in the art, when scanning an image on to a display, there are numerous near-horizontal scans or sweeps of an electrical signal across the screen, say from left to right, starting from the top of the screen with each successive scan below the previous scan, until the bottom of the screen is reached. Once the bottom is reach, a period of time is needed for the scanning device target to return to the top of the screen. During this time, actual video image data is not transmitted because such data could not be displayed on the screen since the scanning device is then busy retracting to its top position. Indeed, also during this same time, alternative data may be communicated. As a result, in FIG. 4a and by way of examples, example scan $ES_1$ is shown to occur during the time of vertical blanking region $R_1$ and it is followed in time by example scan $ES_2$. These example scans are not actual scans on the display, per se, as such would not be visible as the scanning mechanism is instead returning to its top position; instead, they represent time periods wherein other data may be communicated to video device 18 while the scanning mechanism is returning vertically to the top left corner of screen 20. Indeed, further in this regard, vertical blanking region $R_1$ is shown to include a third example scan $ES_3$, with it understood that numerous other scans are permitted within region $R_1$ and also in the interim time periods before, between, or after scans $ES_1$, $ES_2$, and $ES_3$. However, with respect to example scan $ES_3$, it is intended to indicate the timing of line 21 which therefore may include close captioned data as introduced above. Accordingly, example scan $ES_3$ includes the two words of close captioned data explained in connection with FIG. 3, but as further detailed above, in the preferred embodiment this line may carry firmware update code. In the case of the latter, therefore, these two words of firmware code are used to update code in firmware memory 48, as also detailed earlier.

Below vertical blanking region $R_1$ are horizontal blanking region $R_2$ and active video region $R_3$. These regions are intended to depict the passage of time and video data to video device 18 for each horizontal trace across screen 20. More specifically and by way of example, an example scan $ES_4$ is shown that spans both of regions $R_2$ and $R_3$. Such a scan depicts a period of video data that includes data to be displayed as an image on screen 20, where that data is the portion of scan $ES_4$ shown to traverse active video region $R_3$. The portion of scan $ES_4$ that traverses horizontal blanking region $R_2$ represents the period of time where again video data is not transmitted to video device 18 because the scanning mechanism target has reached one end of screen 20 (e.g., the right edge) and then for a period of time ceases to trace image data while it returns to the other end of screen 20 (e.g., the left edge).

Figure 4B:
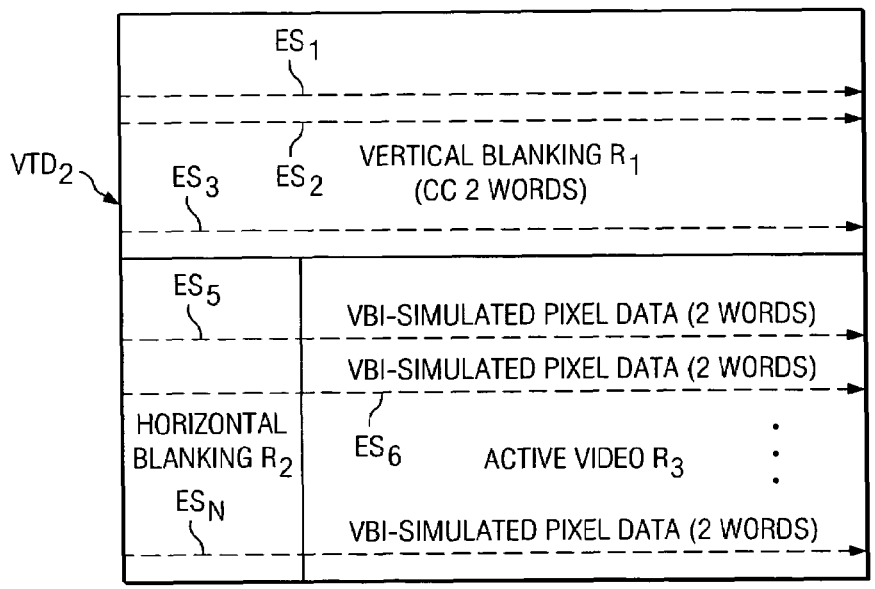
FIG. 4b illustrates a first alternative preferred embodiment by way of a video timing diagram $VTD_2$ that includes numerous periods of analog VBI-simulated pixel data occurring in the active video region of the timing diagram.

Turning to FIG. 4b, it illustrates a first alternative preferred embodiment by way of a video timing diagram $VTD_2$ that shares various of the same aspects of diagram $VTD_1$ of FIG. 4a, including the general depiction and timing implications of the same three regions $R_1$, $R_2$, and $R_3$. However, in FIG. 4b and per an alternative preferred embodiment, the video signal communicated from media receiving and output device 12 to video device 18 further includes numerous periods of analog VBI-simulated pixel data, as is shown by example scans $ES_5$, $ES_6$, through $ES_N$ and with the descriptor "VBI-simulated pixel data" detailed later. In the alternative preferred embodiment of FIG. 4b, in addition to (or in lieu of) example scan $ES_3$ which carries, during the vertical blanking region $R_1$, two words of firmware update code to video system 18 in the form of close captioned data, in diagram $VTD_2$ there are a number of video analog periods that each carry, during the active video region $R_3$, two words of firmware update code to video device 18, where these two words may each include a parity bit as does actual VBI data or instead may carry 8 actual data bits per word. Thus, whereas diagram $VTD_1$ provides only four words of firmware update code per frame (i.e., four words per set of scans, with two sets of scans per frame), diagram $VTD_2$ provides an additional four times N−5+1 (i.e., relating the last and first scans $ES_N$ and scan $ES_5$ in region $R_3$) of firmware update data words per frame. Thus, FIG. 4b illustrates that far more firmware code may be transmitted in this alternative preferred embodiment, while recognizing that such code will temporarily disrupt the flow of actual image data that could be communicated during active video region $R_3$ for purposes of depicting an intended image on screen 20. Indeed, note that data received by video device 18 and corresponding to active video region $R_3$ will be interpreted by device 18 as normal active video and, hence, the user of device 18 may actually see disturbances on screen 20 during receipt of such data. However, the user may be informed in advance that such activity will occur and may therefore anticipate such disturbances as normal and, indeed, even confirming a successful operation during a firmware update process.

Turning now to the above-introduced phrase of "VBI-simulated pixel data" with respect to the example scans in active video region $R_3$ of FIG. 4b, recall that actual VBI data, such as close captioned data, is typically stored in the prior art on data medium 30, and device 12 encodes that data into the form of close captioned analog waveform $CC_{AWV}$ of FIG. 3. However, for data stored on medium 30 that does not correspond to the time period for line 21 or other actual VBI data, such data is instead interpreted by video encoder 32 of device 12 as analog video information and is treated accordingly. In other words, data stored in time periods corresponding to active video region $R_3$ will be encoded as actual video data to be displayed on a screen such as screen 20. Thus, in the alternative preferred embodiment of FIG. 4b, additional considerations must be taken so that the data stored on medium 30 and that ultimately will generate scans $ES_5$ through $ES_N$ will be stored in a form that is compatible on medium 30 with active video data yet will be decoded by device 18 into a digital form that will thereby update firmware memory 48. Such a form is referred to herein as "VBI-simulated pixel data" in that it simulates VBI data but in pixel form, as is described below with reference to FIGS. 5 and 6.

Figure 5:
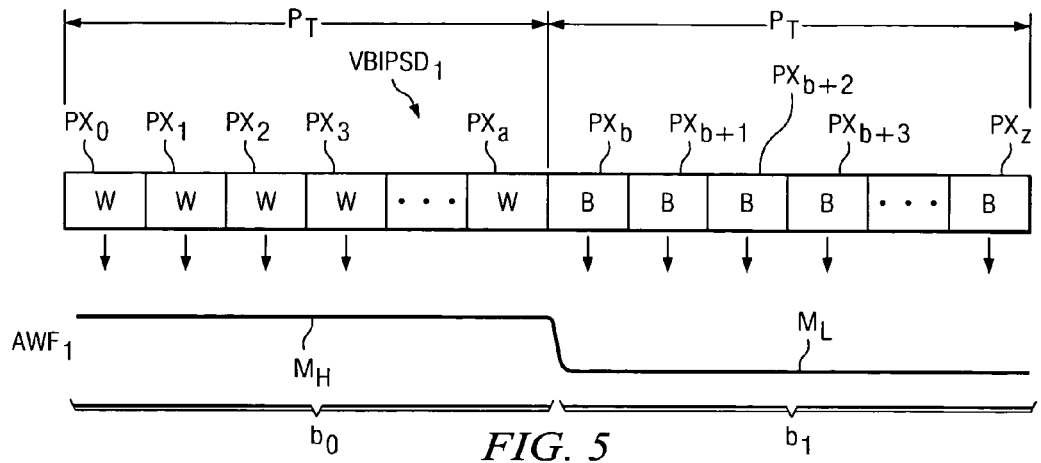
FIG. 5 illustrates a sequence of pixels $PX_0$ through $PX_z$ to depict a sequence of VBI pixel-simulated data $VBIPSD_1$ per a preferred embodiment.

FIG. 5 illustrates a sequence of pixels $PX_0$ through $PX_z$ to depict a sequence of VBI pixel-simulated data $VBIPSD_1$. Data $VBIPSD_1$ may be generated in various fashions so as to accomplish the functions described herein; for example, various contemporary high level computer programs currently exist whereby pixel-by-pixel images may be created, and those images also may be stored as various forms of data. Looking then at the particular example in FIG. 5, such a program is used to create z+1 pixels, where each pixel is of only one of two intensities, preferably as may be achieved and as shown by way of example using monochrome opposites such as white (W) and black (B). Thus, in the sequence VBIPSD$_1$, pixels PX$_0$ through PX$_a$ are white (W), and pixels PX$_b$ through PX$_z$ are black (B). With these pixels generated as displayed images, the digital data corresponding to each such pixel may be stored on a data medium. This same data medium may then be used as data medium 30 in FIG. 2, that is, to be read by device 12 as typical video data. As a result, such data is converted by video encoder 32 into a corresponding analog waveform, as would be other data intended to be used for displaying a video image; in other words, the digital data is stored on medium 30 in the time period of video data to be presented in active video region R$_3$ of FIG. 4b and it is not stored in the time period of actual VBI data (e.g., in the time period of line 21 of the data). Given that the digital data is not stored in the location of VBI data, then when it is encoded as an analog waveform, it takes the form of a typical video image waveform, which is shown in part in a simplified form of analog waveform AWF$_1$ in FIG. 5. Thus, in a monochrome (i.e., not including color) sense, analog waveform AWF$_1$ has a first fully high magnitude M$_H$ when brightness is high as indicated by white, and it descends to a fully and opposite low magnitude M$_L$ when brightness is low as indicated by black.

Continuing with an analysis of the VBI-simulated pixel data VBIPSD$_1$ of FIG. 5, consider now the preferred embodiment when analog waveform AWF$_1$ is received by video device 18 and also in connection with FIG. 2. Particularly, in one aspect, the waveform, having been received during the time period corresponding to data for active video region R$_3$, is processed by data synchronizer 40, display control 42, and screen 20, so that a sequence of a+1 white pixels will be displayed followed by a sequence of z-a+1 black pixels. In addition, however, in the first alternative preferred embodiment, in addition to decoding actual VBI data as described earlier, data decoder 44 includes additional functionality, when enabled such as in response to an assertion of user enable 22, to decode into firmware code an analog waveform that is received during the timing of active video region R$_3$ data. Thus, in the example of waveform AWF$_1$ of FIG. 5, that waveform is again sampled and decoded to a resolution of two, as described earlier in connection with the actual VBI signal of FIG. 3, that is, since the data is encoded to simulate the vertical blanking data format, it may be decoded as if it were actual VBI data. Thus, assuming that pixels PX$_0$ through PX$_a$ span a time period P$_T$ equal in duration to one bit of VBI data, then those pixels are decoded by decoder 44 into a single high binary bit, corresponding therefore by way of example to bit b0 in Character One of FIG. 3. Similarly, assuming that pixels PX$_b$ through PX$_z$ also span a time period P$_T$ equal in duration to one bit of VBI data, then those pixels are decoded by decoder 44 into a single low binary bit, corresponding therefore by way of example to bit b1 in Character One of FIG. 3. For these reasons, therefore, in FIG. 5 the high level of waveform AWF$_1$ is shown to decode to bit b0 and the low level waveform AWF$_1$ is shown to decode to bit b1. Thus, one skilled in the art should appreciate that during each period of time P$_T$ such as is covered by the sequence of pixels PX$_0$ through PX$_a$, by repeating pixel intensity at the same level, the waveform of a VBI character bit may be simulated with pixel data rather than having been encoded from digital values as in the art. Given these attributes, one skilled in the art should now appreciate the choice of the descriptor "VBI-simulated pixel data," in that data corresponding to actual video pixels are stored on data medium 30 in time periods outside of vertical blanking region R$_1$, yet they may be decoded by decoder 44 of video device 18 because the resulting waveform simulates the magnitudes and durations of a VBI waveform as in FIG. 3. Once decoded in this manner, the VBI-simulated pixel data may be used to update code in firmware memory 48 in the same manner as described above with respect to using VBI data for that puopose.

Figure 6:
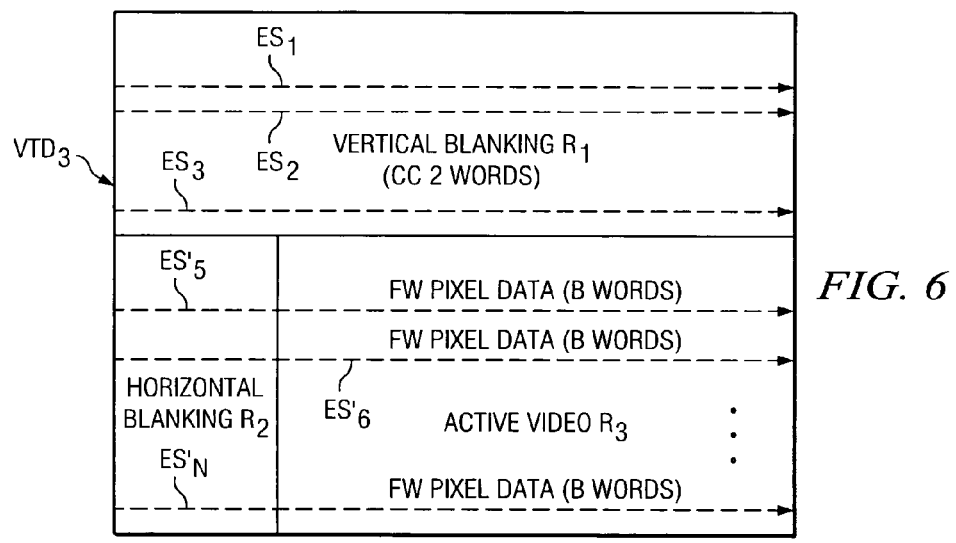
FIG. 6 illustrates a second alternative preferred embodiment by way of a video timing diagram $VTD_3$ that includes numerous periods of firmware (FW) pixel data occurring in the active video region of the timing diagram.

FIG. 6 illustrates a second alternative preferred embodiment by way of a video timing diagram VTD$_3$ that shares various of the same aspects of diagrams VTD$_1$ and VTD$_2$ above, including the timing implications of the same three regions R$_1$, R$_2$, and R$_3$. However, in FIG. 6 and per the second alternative preferred embodiment, the video signal communicated from media receiving and output device 12 to video device 18 further includes numerous periods of what are referred to herein as firmware (FW) pixel data, as shown by example scans ES'$_5$, ES'$_6$, through ES'$_N$ and with the descriptor "FW pixel data" detailed later. In the second alternative preferred embodiment of FIG. 6, in addition to (or in lieu of) example scan ES$_3$ which carries, during the vertical blanking region R$_1$, two words of firmware update code to video system 18 in the form of VBI data, in diagram VTD$_3$ each example scan in active video region R$_3$ represents the transmission by device 12 and receipt by device 18 of a video analog period that carries an integer B words of firmware update code to video device 18. Also, as shown later, B may be much larger than the two words described above in connection with the first alternative preferred embodiment that implements two words of VBI-simulated pixel data per scan. Thus, for the second alternative preferred embodiment, diagram VTD$_3$ provides an additional B*2 times N−5+1 (i.e., relating the last and first scans ES'$_N$ and scan ES'$_5$ in region R$_3$) of firmware update data words per frame. Thus, FIG. 6 illustrates that still more firmware update code may be transmitted in this alternative preferred embodiment than those provided above. As with the preferred embodiment discussed above in connection with FIG. 4b, since the preferred embodiment relating to FIG. 6 transmits firmware code in active video region R$_3$, then data received by video device 18 and corresponding to active video region R$_3$ will be interpreted by device 18 as normal active video data and, hence, the user of device 18 may actually see disturbances on screen 20 during receipt of such data. Again, therefore, the user may be informed in advance that such activity will occur and may therefore anticipate such disturbances as normal and confirming a successful update operation, as further appreciated below.

Figure 7:
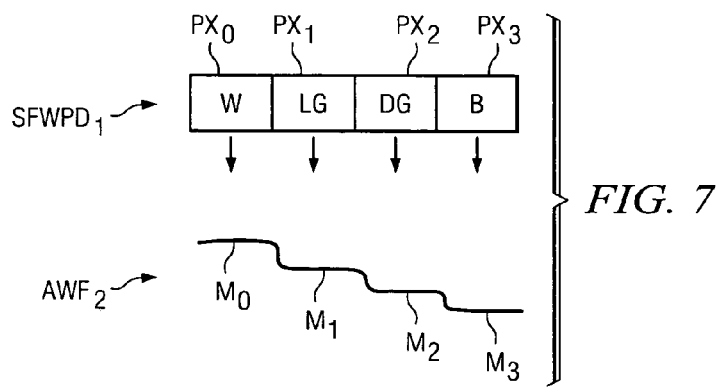
FIG. 7 illustrates a sequence of four pixels $PX_0$ through $PX_3$ to depict a sequence of firmware pixel data $SFWPD_1$ that may be used in connection with the second alternative preferred embodiment so as to generate an analog waveform that is encoded and decoded to provide quantization with more than two magnitude levels.

FIG. 7 illustrates a sequence of four pixels PX$_0$ through PX$_3$ to depict a sequence of firmware pixel data SFWPD$_1$ that may be used in connection with the second alternative preferred embodiment introduced in connection with FIG. 6. Data SFWPD$_1$ may be generated in various fashions so as to accomplish the function described herein; for example, various contemporary high level computer programs currently exist whereby pixel-by-pixel images may be created, and those images also may be stored as various forms of data. Looking then at the particular example in FIG. 7, such a program is used to create four pixels, of the intensities shown in the Figure. In the sequence SFWPD$_1$, pixel PX$_0$ is white (W), pixel PX$_1$ is light-gray (LG), pixel PX$_2$ is dark gray (DG), and pixel PX$_3$ is black (B). In any event, the digital data corresponding to each such intensity is stored on a data medium. This same data medium may then be used as data medium 30 in FIG. 2, that is, to be read by device 12 as typical video data, since that data is located in a time period reserved for active video data. As a result, such data is converted by video encoder 32 into a corresponding analog waveform, as would be other data intended to be used for displaying a video image; in other words, the digital data is stored on medium 30 in the location of video to be presented in the active video region $R_3$ of FIG. 4b and it is not stored as actual VBI data (e.g., in line 21 of the data). Given that the digital data is not stored in the location of VBI data, then when it is encoded as an analog waveform, it takes the form of a typical video image waveform, which is shown in part in a simplified form as analog waveform $AWF_2$ in FIG. 7. Thus, in a monochrome (i.e., not including color) sense, analog waveform $AWF_2$ has a first relatively large magnitude $M_0$ when brightness is higher toward white, and descends a step downward to a magnitude $M_1$ corresponding to a darker intensity, as shown by the drop in intensity from white at pixel $PX_0$ to light gray at pixel $PX_1$. Similarly, for each additional pixel $PX_2$ and $PX_3$, the additional reduction in monochrome intensity causes the magnitude level of waveform $AWF_2$ to drop farther, where it can be sent that the magnitude level drops to $M_2$ for dark gray at pixel $PX_2$ and to magnitude $M_3$ for black at pixel $PX_3$.

Figure 8:
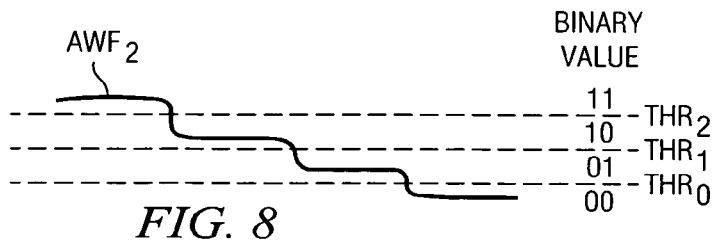
FIG. 8 illustrates a diagram of a decoding functionality that may be added to data decoder 44 of FIG. 2 in a preferred embodiment for decoding a received analog waveform that has more than two magnitude levels.

FIG. 8 illustrates a diagram of a decoding functionality that may be added to data decoder 44 of FIG. 2 in the second alternative preferred embodiment for decoding a received analog waveform that has more than two magnitude levels. By way of introduction, assume that analog waveform $AWF_2$ of FIG. 7 is received at analog interface 16 of FIG. 2 and, as discussed above, it is therefore coupled to data synchronizer 40. Per the discussion provided earlier with respect to FIG. 2, and since waveform $AWF_2$ is part of the video signal corresponding to active video region $R_3$, then that waveform is then used by control 42 to control the image producing hardware and to produce a corresponding intensity on screen 20. Thus, for the four pixels represented by waveform $AWF_2$, they will be displayed on screen 20 in the form as shown in FIG. 7, that is, as a pixel sequence consisting of white, light gray, dark gray, and black. However, in the second alternative preferred embodiment, in addition to decoding actual VBI data as described earlier, data decoder 44 includes additional functionality, which may be enabled such as in response to an assertion of user enable 22, to decode the analog waveform $AWF_2$. In the example of FIG. 8, such functionality is by way of a decoder having a resolution of four, that is, the magnitude of analog waveform $AWF_2$ is sampled and determined to correspond to one of four binary values, that is, it is quantized to one of four values. Such operation is further illustrated by way of three thresholds in FIG. 8, $THR_0$, $THR_1$, and $THR_2$. Particularly and by way of example, in the second alternative preferred embodiment, as decoder 44 receives a non-VBI analog waveform such as waveform $AWF_2$, decoder 44 quantizes the waveform to one of four values: (i) if the magnitude level of the waveform is below threshold $THR_0$, then decoder 44 quantizes that sample to a binary value of 00; (ii) if the magnitude level of the waveform is above threshold $THR_0$ and below threshold $THR_1$, then decoder 44 quantizes that sample to a binary value of 01; (iii) if the magnitude level of the waveform is above threshold $THR_1$ and below threshold $THR_2$, then decoder 44 quantizes that sample to a binary value of 10; and (iv) if the magnitude level of the waveform is above threshold $THR_2$, then decoder 44 quantizes that sample to a binary value of 11. Thus, each period of analog waveform $AWF_2$ that corresponds to a pixel $PX_x$ in FIG. 7 is decoded by quantizing it to a 2-bit value due to the existence of four magnitude levels; note, therefore, that the quantization is doubled as compared to the use of VBI data described above, since that type of data is limited to a quantization of only two. Thus, the four pixels in FIG. 7, when encoded into an analog waveform by device 12, are decoded by video device 18 to provide a total of 8 bits, that is, one byte, of firmware update data. Further, as discussed above, these quantized bits are then coupled to update controller 46 and then provided as firmware updates to firmware memory 48.

Figure 9:
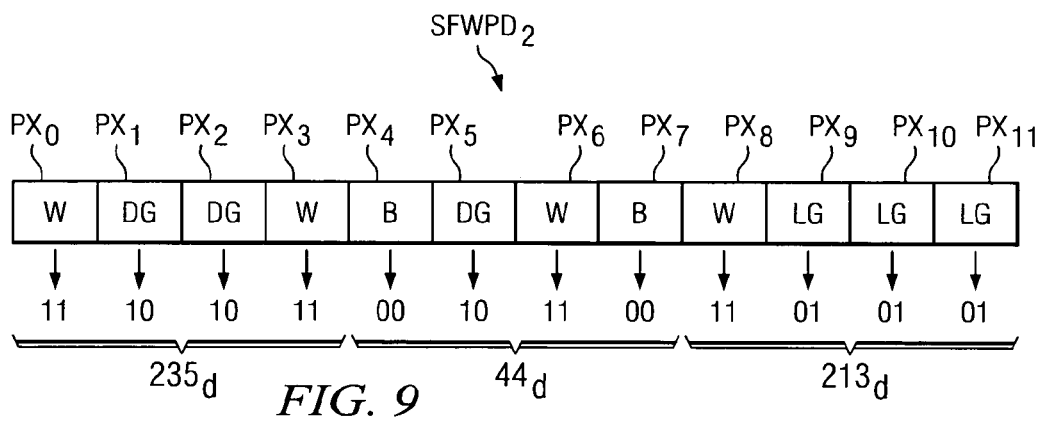
FIG. 9 illustrates that the example of FIGS. 7 and 8 may be extended to a larger number of pixels.

FIG. 9 illustrates that the example of FIGS. 7 and 8 may be extended to a larger number of pixels, and indeed the number of pixels may be increased toward the limit of the number of pixels that may be scanned across active video region $R_3$. Thus, with this number NR of pixels being used, then a total of NR/4 bytes may be provided for each scan line, that is, in FIG. 6, B=NR/4. Looking then to FIG. 9, it illustrates a sequence of twelve pixels $PX_0$ through $PX_{11}$ to depict a sequence of firmware pixel data $SFWPD_2$. Data $SFWPD_2$ may be generated in the same manners as discussed above with respect to data $SFWPD_1$, so as to provide the active video region sequence of bits shown. Moreover, data $SFWPD_2$ illustrates the same intensity descriptors as data $SFWPD_1$ and, thus, includes white pixels $PX_0$, $PX_3$, $PX_6$, and $PX_8$, light gray pixels $PX_9$, $PX_{10}$, and $PX_{11}$, dark gray pixels $PX_1$, $PX_2$, and $PX_5$, and black pixels $PX_4$ and $PX_7$. Thus, in the second alternative preferred embodiment, the digital value for each of these pixels is identified and stored on data medium 30. Moreover, when encoded by device 12, a corresponding analog waveform (not shown) is generated with a magnitude level for each pixel, and that waveform is communicated via cable 14 to video device 18. As a result and with these particular values, one skilled in the art may apply the above discussion of FIG. 8 to FIG. 9. Consequently, a magnitude sample of the analog waveform for each respective pixel $PX_x$ in FIG. 9 is decoded into one of four 2-bit values, with those values shown in FIG. 9. Moreover, each set of four 2-bit values provides a byte of information, with the decimal equivalents also shown in FIG. 9. Thus, in the example of FIG. 9, a total of three bytes are illustrated, with decimal values in the sequence equal to $235_d$, $44_d$, and $213_d$. Using this same approach, therefore, NR for each line of data may be increased to 50% or more of the available pixels, thereby providing a large increase on available bandwidth for firmware update code per the preferred embodiments. However, note that in one alternative preferred embodiment, not all of the time period of each scan in active video region $R_3$ is used. This allows for the fact that there may be variations in how various display sources (e.g., DVD players and VCR players) actually generate their output video waveform and may include spatial shifting.

Given the preceding, various observations may be made with respect to the second alternative preferred embodiment. First, like the preferred embodiment demonstrated with respect to FIG. 4a, actual VBI data may be stored on data medium 30 (e.g., in line 21 or otherwise corresponding to vertical blanking region $R_1$) in the form of digital close captioned or other data, where that data is then encoded by device 12 into the format of FIG. 3, communicated in the form of an analog waveform along cable 14, received at analog interface 16, decoded and quantized by decoder 44 as if it were VBI data into one of two binary states, and then used by update controller 46 to update the firmware in firmware memory 48. Second, firmware update data may be encoded and decoded in a second fashion, as illustrated in FIGS. 6 through 9. Specifically, data may be stored on data medium 30 in the form of digital data that corresponds to a sequence of active region video pixels, rather than VBI data, where that pixel data is stored within the time period of the video signal corresponding to active video region $R_3$; as a result, that data is then encoded by device 12 into the format of a video signal analog waveform that is received by video device 18 and used to drive its imaging apparatus so as to provide an image on screen 20. However, either in addition to or in lieu of being used by video device 18 to display an image, such data is also decoded and quantized by decoder 44 into binary values, where in the example provided the quantization is greater than a resolution of two as was the case for VBI data and is in the case of FIGS. 8 and 9 quantized into a resolution of four, that is, each sample period of the waveform corresponding to a single pixel of transmitted data is decoded into one of four binary states. The binary values are and then used by update controller 46 to update the firmware in firmware memory 48.

The approach of FIG. 9 may be extended and limited in various fashions so as to present still other alternative preferred embodiments. For example, the illustration of FIG. 9 depicts an instance where each pixel carries 2 bits of information, by virtue of using a set of four monochrome pixels of varying intensities thereby corresponding to four different magnitude levels in the encoded analog waveform, again exceeding the two magnitude levels that are encoded in a VBI signal. Indeed, in a highly efficient transfer system, each pixel could provide a byte of information by quantizing it to 8 bits, yielding 256 possible magnitude levels in the analog waveform that would represent each such pixel. In such a case, it would be possible to transfer one byte of information for each pixel of the video display, giving a bandwidth of 720×480×30 bytes per second (10 megabytes per second) for an NTSC signal. However, in practical implementation, some issues may limit that highly efficient scenario. A first limiting issue is that not all 256 magnitude levels are available for the active video dynamic range. A second limiting issue is that the video signal bandwidth usually available in a video system does not allow for accurate maximum to minimum signal transitions to be determined from one video pixel to the next.

Figure 10:
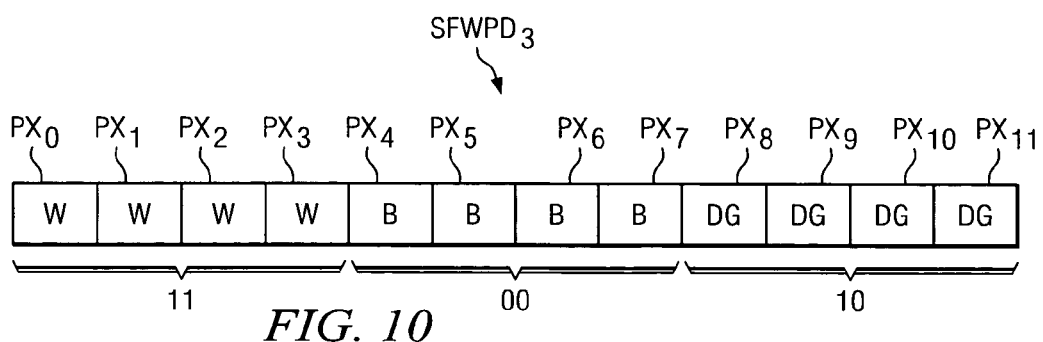
FIG. 10 illustrates a sequence of twelve pixels $PX_0$ through $PX_{11}$ to depict a sequence of firmware pixel data $SFWPD_3$ that may be used in connection with a preferred embodiment alternative and wherein the pixels are of same intensity for each group of four pixels.

The above-discussed issues that may limit an increase in bandwidth may be accommodated by reducing the firmware code bandwidth by way of certain compromises. For example, instead of quantizing the data into 256 magnitude levels, each pixel may be quantized into some lesser amount, based on then-existing technology; for example, with contemporary technologies, quantizing each pixel into 4 magnitude levels, as was shown in the approach of FIGS. 7 through 9, may render a beneficial compromise. As another example, instead of using a single video pixel for each quantized piece of information, a number of successive pixels may be used. To demonstrate this alternative, FIG. 10 illustrates a sequence of twelve pixels $PX_0$ through $PX_{11}$ to depict a sequence of firmware pixel data $SFWPD_3$ that may be used in connection with a preferred embodiment alternative. For data $SFWPD_3$, again the digital value for each pixel is stored on medium 30, but note that preferably the pixels are of a same intensity for each group, GR, of pixels, where in the illustrated example GR=4. For example, all pixels in a first group of pixels $PX_0$ through $PX_3$ are white, all pixels in a second group of pixels $PX_4$ through $PX_7$ are black, and all pixels in a third group of pixels $PX_8$ through $PX_{11}$ are dark gray. Thus, when encoder 32 of device 12 encodes those pixels into an analog waveform, the waveform is relatively constant in magnitude level for each group of four pixels, that is, for a duration of four pixel periods. As a result, when this waveform is received and decoded by video device 18, it may sample across four pixel periods for each quantizing operation. Thus, for the first group of four pixels, a binary value of 11 is realized, for the second group of four pixels, a binary value of 00 is realized, and for the third group of four pixels, a binary value of 10 is realized. Thus, the preceding demonstrates that both the number of quantization magnitude levels may be varied as may be the number of pixels used to correspond to a single quantization determination. By varying these factors, the reliability of the accuracy of firmware code transfer can be increased substantially, while still retaining a relatively high firmware code bandwidth.

From the above it may be appreciated that the preferred embodiments provide an apparatus and methodology for updating embedded firmware in a video system. Various preferred embodiments are provided in this regard, and each has advantages that will be ascertainable by one skilled in the art. Various advantages are provided by the preferred embodiments as discussed above, and still others exist as do additional considerations for creating still other alternative preferred embodiments. For example, while the illustration of FIG. 10 uses a group of four pixels per each quantization event, another preferred embodiment may use a different number of pixels, such as five pixels, again allowing the data processing to sample a midpoint in the waveform corresponding to those pixels, where that midpoint is spread across a larger period. As yet another example, the firmware code that is transported over cable 14 should preferably include a large amount of error checking information and possibly even error correction functionality (e.g., Reed-Solomon encoded data). Error checking may be implemented in various fashions. For one approach, within the information stream the transported data could be split into blocks for simpler error correction. In another approach, each block could or should be transmitted multiple times, either spatially within the video image or temporally over fields. Such approaches permit video system 18 to recapture corrupt or missed blocks, negating the need for the user to repeat the transmission of the video stream. A more robust system also may be produced that repeats the firmware update code with successively fewer quantization magnitude levels and/or longer information bits per quantization event so that video device 18 can keep looking for corrupt/missing information blocks on successively more robust transmissions. Thus, the preceding discussion, alternatives, and benefits should further demonstrate that while the present embodiments have been described in detail, various substitutions, modifications or alterations could be made to the descriptions set forth above without departing from the inventive scope which is defined by the following claims.

The invention claimed is:

1. An electronic device, comprising:
   an analog interface for receiving an analog waveform, wherein the analog waveform includes time periods for carrying firmware code in a data encoding format;
   imaging circuitry that generates signals that correspond to an image for displaying on an image screen in response to at least a portion of the analog waveform;
   memory for storing the firmware code; and
   processing circuitry that decodes at least one line of the data encoding format into two or more units of the firmware code, that quantizes the firmware code in data encoding format into one of two or more values, and that is adapted to write the firmware code in the memory.

2. The electronic device of claim 1, wherein the data encoding format is a vertical blanking format.

3. The device of claim 2, wherein the two or more units further comprise two or more words of firmware code.

4. The device of claim 2, wherein the processing circuitry decodes actual vertical blanking data encoded in the vertical blanking data format.

5. The device of claim 2, wherein the processing circuitry decodes data in the vertical blanking data format that is encoded into a vertical blanking timing region in the analog waveform.

6. The device of claim 2, wherein the processing circuitry decodes data in the vertical blanking data format that is encoded at least in part into an active video timing region in the analog waveform.

7. The device of claim 1, wherein the data encoding format is an active video data format.

8. The device of claim 7, wherein the processing circuitry quantizes the firmware code in the active video data format into one of more than two values in response to a sampled magnitude level of the analog waveform.

9. The device of claim 7, wherein the the firmware code is quantized into one of four values.

10. The device of claim 7, wherein the processing circuitry quantizes the firmware code such that each quantization event corresponds to a duration of a group of same intensity pixel values encoded into the firmware code in the active video data format.

11. The device of claim 10, wherein the group of same intensity pixel values consists of either four or five same intensity pixel values.

12. The device of claim 7, wherein the processing circuitry quantizes the firmware code in the active video data format such that each quantization event corresponds to a pixel intensity value encoded into the firmware code in the active video data format.

13. The device of claim 7, wherein the two or more units further comprise more than two bytes of firmware code.

14. The device of claim 13, wherein the firmware code in the active video data format corresponds to a number of pixel intensity values encoded into the firmware code in the active video data format.

15. The device of claim 1, wherein the processing circuitry further comprises error checking circuitry that checks the firmware code for errors.

16. A method of operating an electronic device comprising an analog interface and an image screen and a memory for storing firmware code, the method comprising:
   receiving an analog waveform, wherein the analog waveform includes time periods for carrying firmware code in a data encoding format;
   generating signals that correspond to an image for displaying on the image screen in response to at least a portion of the analog waveform;
   decoding at least one line of the data encoding format into two or more units of the firmware code;
   quantizing the firmware code in data encoding format into one of two or more values; and
   writing firmware code in the memory in response to at least a portion of the analog waveform.

17. The method of claim 16, wherein the data encoding format is a vertical blanking data format.

18. The method of claim 17, wherein the step of decoding the vertical blanking data format further comprises decoding data in the vertical blanking data format that is encoded into a vertical blanking timing region in the analog waveform.

19. The method of claim 17, wherein the step of decoding further comprises decoding data in the vertical blanking data format that is encoded at least in part into an active video timing region in the analog waveform.

20. The method of claim 17, wherein the step of decoding further comprises decoding at least one line of the data encoding format into two or more words of the firmware code.

21. The method of claim 16, wherein the step of decoding further comprises decoding at least one line of the data encoding format into two or more bytes of the firmware code.

* * * * *

UNITED STATES PATENT AND TRADEMARK OFFICE
CERTIFICATE OF CORRECTION

PATENT NO.      : 7,577,981 B2                                       Page 1 of 1
APPLICATION NO. : 11/095358
DATED           : August 18, 2009
INVENTOR(S)     : Clynes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Seventh Day of September, 2010

David J. Kappos
*Director of the United States Patent and Trademark Office*